(12) United States Patent
Whittaker

(10) Patent No.: US 6,284,324 B1
(45) Date of Patent: Sep. 4, 2001

(54) COAL GASIFICATION BURNER SHIELD COATING

(75) Inventor: Gary Scott Whittaker, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/556,847

(22) Filed: Apr. 21, 2000

(51) Int. Cl.[7] ............... C23C 4/04; C23C 14/06; B05B 1/28; F23D 11/38
(52) U.S. Cl. ............ 427/452; 427/453; 427/455; 427/456; 427/585; 427/597; 431/159; 204/192.1; 204/192.15; 204/192.16; 239/288.5
(58) Field of Search .................. 427/455, 456, 427/452, 453, 585, 597; 431/159; 239/288.5; 204/192.15, 192.16, 192.1, 192.11

(56) References Cited

U.S. PATENT DOCUMENTS

| | | |
|---|---|---|
| 2,809,104 | 10/1957 | Strasser et al. . |
| 3,918,139 | 11/1975 | Felton . |
| 4,101,713 | 7/1978 | Hirsch et al. . |
| 4,124,737 | * 11/1978 | Wolfla et al. ............... 428/640 |
| 4,429,019 | 1/1984 | Schrewelius . |
| 4,585,481 | 4/1986 | Gupta et al. . |
| 4,775,314 | 10/1988 | Sternling . |
| 4,865,542 | 9/1989 | Hasenack et al. . |
| 4,921,405 | 5/1990 | Wilson . |
| 4,952,218 | * 8/1990 | Lipp et al. ................. 48/86 R |
| 5,246,063 | 9/1993 | Fix et al. . |
| 5,273,212 | 12/1993 | Gerhardus et al. . |
| 5,277,936 | 1/1994 | Olson et al. . |
| 5,934,206 | 8/1999 | Saxon et al. . |
| 5,941,459 | 8/1999 | Brooker et al. . |
| 5,947,716 | 9/1999 | Bellamy et al. . |
| 5,954,491 | 9/1999 | Helton et al. . |

OTHER PUBLICATIONS

I. Al–Taie, R. J. Brigham, and Y. Lafreniere, "High–Temperature Alloys and Thermal Spray Coatings for Energy Conversion Systems," Proceedings of the 2$^{nd}$ International Conference on Heat–Resistant Materials, Gatlinburg, Tennessee, Sep. 11–14, 1995, pp. 437–444.

* cited by examiner

Primary Examiner—Katherine A. Bareford
(74) Attorney, Agent, or Firm—Matthew W. Smith; Bernard J. Graves

(57) ABSTRACT

A method for protecting a synthesis gas generator burner heat shield includes coating the burner heat shield with an overlay alloy coating composition of the formula MCrAlY wherein M is selected from the group consisting of iron, nickel, and cobalt. In a preferred embodiment, the coating includes from about 20–40 weight % Co, 5–35 weight % Cr, 5–10 weight % Ta, 0.8–10 weight % Al, 0.5–0.8 Y, 1–5 weight % Si and 5–15 weight % $Al_2O_3$.

3 Claims, 2 Drawing Sheets

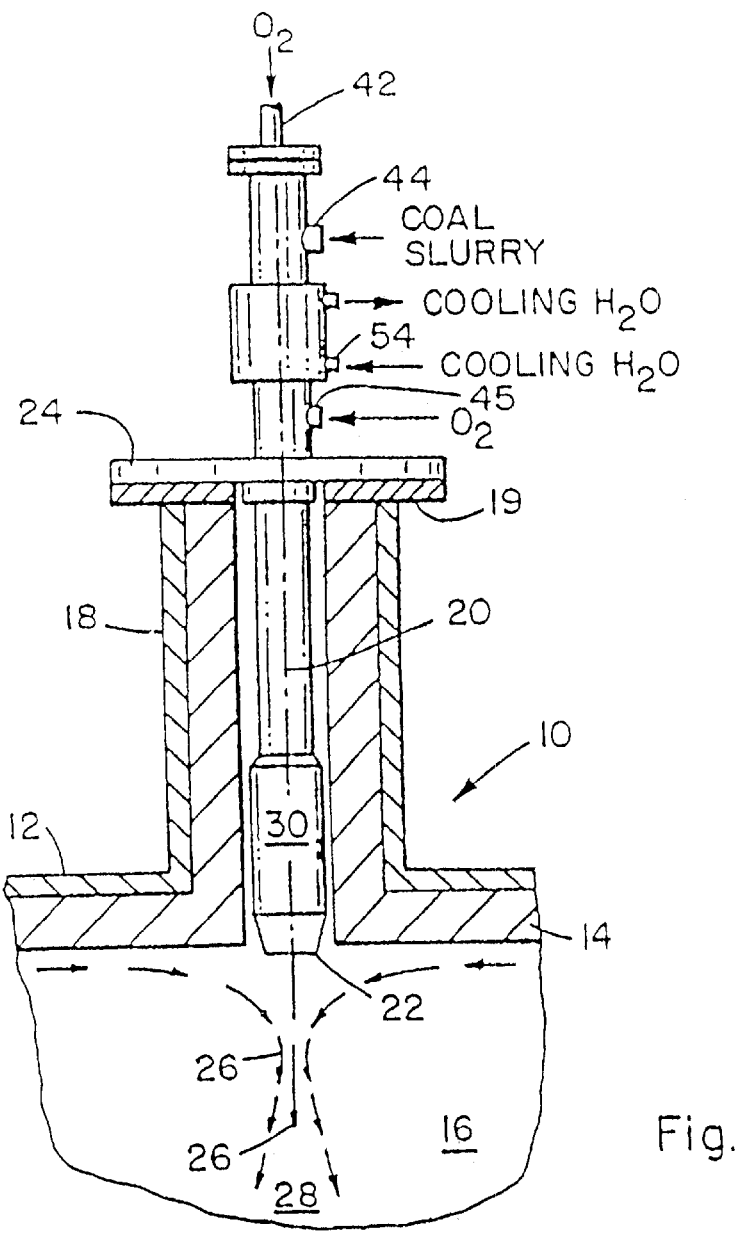
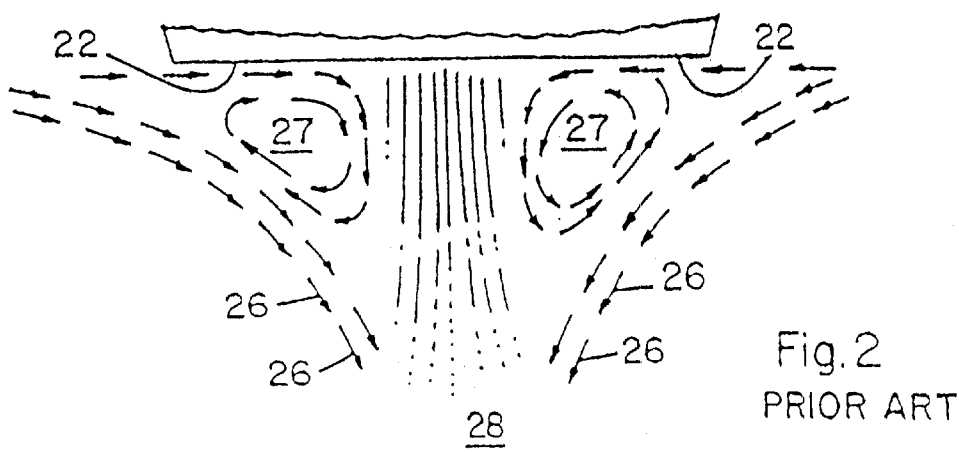
Fig. 1
Fig. 2
PRIOR ART

COAL GASIFICATION BURNER SHIELD COATING

BACKGROUND OF THE INVENTION

1. Field of the Invention

The present invention relates to an apparatus for a partial oxidation synthesis gas generation of carbon monoxide, carbon dioxide and hydrogen from the combustion of a fossil fuel source in the presence of water and oxygen. Specifically, the present invention relates to a coating for a shielding device utilized in a fuel-injection burner assembly.

2. Background of the Invention

Synthesis gas mixtures comprising carbon monoxide and hydrogen are important commercially as a source of gaseous feed stocks, such as hydrogen, for hydrogenation reactions and as a source of feed gas for the synthesis of hydrocarbons, oxygen-containing organic compounds or ammonia.

Generally, in a synthesis gas operation a fuel stream composed primarily of a pumpable slurry of finely particulated coal and water are sprayed along with an oxidizer into the refractory-lined combustion chamber of the synthesis gas generator. The oxidizer gas contains substantial quantities of free oxygen to support the combustion reaction of the coal. The combustion reaction components of fuel and oxidizer are sprayed under significant pressure, typically about 80 bar, into the synthesis gas combustion chamber. A hot gas stream is produced in the combustion chamber at a temperature in the range of about 700° C. to about 2500° C. and at a pressure in the range of about 1 to about 300 atmospheres and more particularly, about 10 to about 100 atmospheres. The effluent raw gas stream from the gas generator includes such gasses as hydrogen, carbon monoxide, carbon dioxide and can include other gases such as methane, hydrogen sulfide and nitrogen depending on the fuel source and reaction conditions.

The partial combustion of a sulfur bearing hydrocarbon fuel such as coal with oxygen-enriched air or with relatively pure oxygen to produce carbon monoxide, carbon dioxide and hydrogen presents unique problems not encountered normally in the burner art. It is necessary, for example, to effect very rapid and complete mixing of the reactants, as well as to take special precautions to protect the burner or mixer from over heating. Typically, the fuel injection nozzle serving the combustion chamber is configured to have the slurry fuel stream concentrically surround a first oxidizer gas stream along the axial core of the nozzle. A second oxidizer gas stream surrounds the fuel stream annulus as a larger, substantially concentric annulus. Radially surrounding an outer wall of the outer oxidizer gas channel is an annular cooling water jacket terminated with a substantially flat end-face heat sink aligned in a plane substantially perpendicular to the nozzle discharge axis. Cool water is conducted from outside the combustion chamber into direct contact with the backside of the heat sink end-face for conductive heat extraction.

Because of the reactivity of oxygen and sulfur contaminants with the burner metal, it is imperative to prevent the burner elements from reaching those temperatures at which rapid oxidation and corrosion takes place. In this respect, it is essential that the reaction between the hydrocarbon and oxygen take place entirely outside the burner proper and prevent localized concentration of combustible mixtures at or near the surfaces of the burner elements. Even though the reaction takes place beyond the point of discharge from the burner, the burner elements are subjected to heating by radiation from the combustion zone and by turbulent recirculation of the burning gases.

Moreover, it is believed that a confluence of a recirculated gas flow stream with the nozzle emission stream generates a standing eddy of hot, turbulent combustion product comprising highly corrosive sulfur compounds. These hot, corrosive compounds surround the nozzle discharge orifice in a turbulent manner and scrubs the heat shield face at the confluence.

For these and other reasons, prior art burners are characterized by failures due to metal corrosion about the burner tips, even when these elements have been water cooled and where the reactants have been premixed and ejected from the burner at rates of flow in excess of the rate of flame propagation.

Efforts to ameliorate these harmful effects on the injector nozzle have been disclosed. For example, U.S. Pat. No. 5,934,206 discloses a heat shield having a plurality of ceramic tiles, each covering the end face of a respective arc segment of the annulus around the nozzle. The tiles are formed of a refractory ceramic or other high melting point material as individual elements. The individual tiles are secured to the coolant jacket end face by a high temperature brazing compound.

U.S. Pat. No. 5,954,491 discloses a ceramic heat shield that is mechanically secured over the water jacket end-face of the injector nozzle. This heat shield is formed as an integral ring or annulus around the nozzle orifice. The outer face of the heat shield is substantially smooth and uninterrupted to provide minimum contact with the reaction gases and reduced opportunity for reactive combination. The inner face of the heat shield, i.e., that side contiguous with the water jacket end-face, includes a plurality of socket pairs, each pair in radial alignment around the heat shield annulus. A bayonet channel extends from the outer perimeter of the heat shield, between and parallel with the outer and inner heat shield faces, and through each socket pair. A corresponding number of mounting studs project from the water jacket end-face. The studs are appropriately positioned to be in register with the sockets. Each stud includes an aperture that aligns axially with respective bayonet channel bores. With the heat shield in position against the water jacket end-face and the end-face studs penetrating the heat shield sockets, bayonet wires are inserted along the radial channel bore to deadbolt the heat shield to the water jacket-end face at multiple attachment points.

U.S. Pat. No. 5,947,716 discloses a heat shield having a pair of rings where each ring is a full annulus about the nozzle axis that faces or shields only a radial portion of the entire water jacket face annulus. An inner ring is mechanically secured to the metallic nozzle structure by meshing segments about the nozzle axis. The external elements of these segments (lugs) are integral projections from the external cone surface of the nozzle lip. Each of three lugs projecting from the external cone lip is an arcuate portion of an independent ring fin. The internal perimeter of the inner heat shield ring is formed with a channel having a corresponding number of cuts in the wall to receive and pass the respective external lug elements. When assembled, the inner heat shielding ring is secured against rotation by a spot welded rod of metal that is applied to the nozzle cooling jacket face within a notch in the outer perimeter of the inner ring. Additionally, the outer perimeter of the inner heat shield ring is formed with an approximately half thickness step ledge or lap that overlaps a corresponding step ledge or lap on the internal perimeter of an outer heat shield ring. The outer heat shield ring is secured to the water jacket face by a second set of external lug elements projecting from the outer perimeter of the water jacket face. A cuff bracket around the perimeter of the outer heat shield ring provides a structural channel for receiving the outer set of water jacket lugs. The outer heat shield ring is also held in place by a tack-welded rod or bar.

U.S. Pat. No. 5,273,212 discloses a shielded burner clad with individual ceramic platelets which are arranged adjacent to each other in a mosaic surface-covering manner.

U.S. Pat. No. 5,941,459 discloses an annular refractory insert is interlocked with the fuel injector nozzle at the downstream end proximate the nozzle outlet. A recess formed in the downstream end of the fuel injector nozzle accommodates the annular refractory insert.

A problem with the aforementioned shielding devices recently discovered is that in the case where the shielding device is constructed of a high temperature metal, such as molybdenum, the shielding device is subjected to abnormally high rates of oxidative degeneration associated with the period when the synthesis gas generation chamber is being brought up to temperature. Typically, the burner assembly is subjected to relatively high concentrations of oxygen at temperatures greater than about 600° C. This oxidative degeneration of the metal can lead to failure of the shielding device which results in premature failure of the burner assembly.

Accordingly, there is a need for a heat shielded burner for synthesis gas generation which is an improvement over the shortcomings of prior art appliances, is simple in construction and economical in operation.

SUMMARY OF THE INVENTION

Briefly, the present invention is a method for protecting a synthesis gas generator burner heat shield. The heat shield utilized for protecting the burner nozzle is itself advantageously protected during startup where an oxidizing and high temperature environment is present. In accordance with present invention, the heat shield is coated with an overlay alloy composition comprising MCrAlY wherein M is selected from the group consisting of iron, nickel, and cobalt.

Briefly, the present invention is an improvement over the previous synthesis gas burner nozzle shielding devices. The burner nozzle assembly has a burner outlet for permitting the flow of fluid carbonaceous fuel and an oxygen containing streams into the synthesis gas generation chamber and includes a cooling chamber than concentrically surrounds the burner outlet. The cooling chamber includes an annular heat sink having a flat end-face disposed toward the synthesis gas generation chamber. The annular end-face is generally aligned in a plane substantially perpendicular to the nozzle discharge axis. Cool water is circulated from outside the combustion chamber into direct contact with the backside of the heat sink end-face for conductive heat extraction. The nozzle assembly includes a heat shield having an inner surface that has one surface adjacent to, and preferably in contact with, the annular surface of the heat sink. The heat shield has an outer surface that is positioned toward said synthesis gas generation chamber. To affix the heat shield to the burner nozzle assembly in a manner that facilitates intimate contact between the annular surface of the heat sink and the inner surface of the heat shield, a threaded retaining means is employed.

It is an object of the present invention to provide a protected heat-shield for a burner assembly used for synthesis gas generation which is simple in construction and economical in operation.

Another object of the invention is to provide a synthesis gas generation burner nozzle shield having a greater operational life expectancy.

These and other objects and advantages of the present invention will become more apparent to those skilled in the art in view of the following description and the accompanying drawings wherein like parts have similar reference numerals. It is to be understood that the inventive concept is not to be considered limited to the constructions disclosed herein but instead by the scope of the appended claims.

BRIEF DESCRIPTION OF THE DRAWINGS

FIG. 1 is a partial sectional view of a synthesis gas generation combustion chamber and burner.

FIG. 2 is a detail of the combustion chamber gas dynamics at the burner nozzle face.

DETAILED DESCRIPTION OF THE INVENTION

Figure 3:
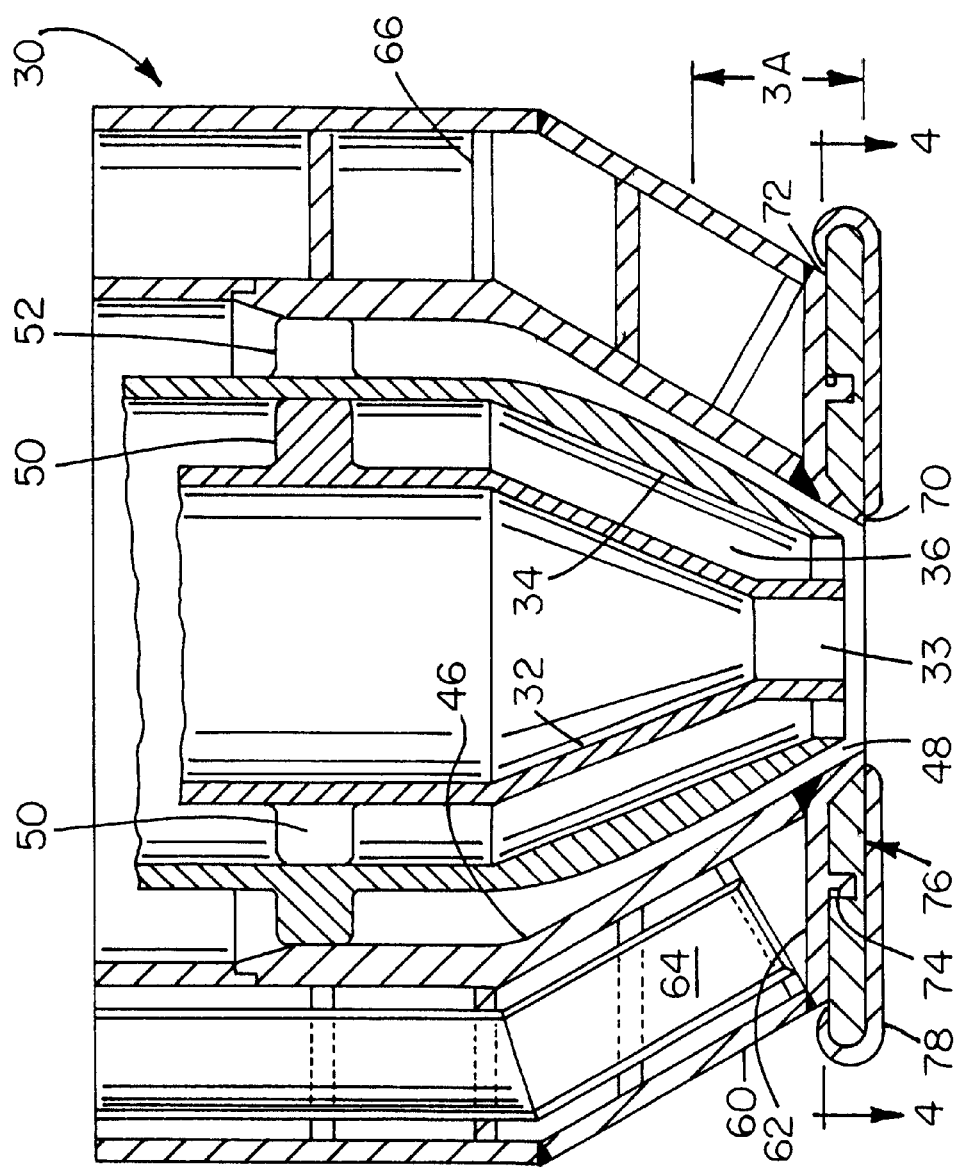
FIG. 3 is a cross-sectional view of the burner nozzle of FIG. 1 fitted with a heat shield. In accordance with the present invention, the heat shield includes a protective coating covering the combustion chamber surface of the heat shield.

Referring to FIG. 1, a partial cut-away view of a synthesis gas generation vessel 10 is illustrated. The vessel 10 includes a structural shell 12 and an internal refractory liner 14 around an enclosed combustion chamber 16. Projecting outwardly from the shell wall is a burner mounting neck 18 for supporting an elongated fuel injection burner assembly 20 within the reactor vessel. The burner assembly 20 is aligned and positioned so that the face 22 of the burner is substantially flush with the inner surface of the refractory liner 14. A burner mounting flange 24 secures the burner assembly 20 to a mounting neck flange 19 of the vessel 10 to prevent the burner assembly 20 from becoming ejected during operation.

Although not wishing to be bound by any theory, it is believed that FIGS. 1 and 2 partially represent the internal gas circulation pattern within the combustion chamber. Gas flow direction arrows 26 are driven by the high temperature and combustion conditions within the combustion chamber 16. Depending on the fuel and induced reaction rate, temperatures along a reaction core 28 may reach as high as 2500° C. As the reaction gas cools toward the end of the synthesis gas generation chamber 16, most of the gas is drawn into a quench chamber similar to that of the synthesis gas process described by U.S. Pat. No. 2,809,104. However, a minor percentage of the gas spreads radially from the core 28 to cool against the reaction chamber enclosure walls. The recirculation gas layer is pushed upward to the top center of the reaction chamber where it is drawn into the turbulent down flow of the combustion column. With respect to the prior art model of FIG. 2, at the confluence of the recirculation gas with the high velocity core 28, a toroidal eddy flow 29 is produced that turbulently scrubs the burner head face 22 thereby enhancing opportunities for chemical reactivity between the burner head face material and the highly reactive, corrosive compounds carried in the combustion product recirculation stream.

Referring to FIGS. 1 and 3, the burner assembly 20 includes an injector nozzle assembly 30 comprising three concentric nozzle shells and an outer cooling water jacket 60. The inner nozzle shell 32 discharges from an axial bore opening 33 the oxidizer gas that is delivered along upper assembly axis conduit 42. Intermediate nozzle shell 34 guides the coal slurry delivered to the upper assembly port 44 into the combustion chamber 16. As a fluidized solid, this coal slurry is extruded from the annular space 36 defined by the inner shell wall 32 and the intermediate shell wall 34. The outer, oxidizer gas nozzle shell 46 surrounds the outer nozzle discharge annulus 48. The upper assembly port 45, supplies the outer nozzle discharge annulus with an additional stream of oxidizing gas.

Centralizing fins 50 and 52 extend laterally from the outer surface of the inner and intermediate nozzle shell walls 32 and 34, respectively to keep their respective shells coaxially centered relative to the longitudinal axis of the burner assembly 20. It will be understood that the structure of the fins 50 and 52 form discontinuous bands about the inner and intermediate shells and offer small resistance to fluid flow within the respective annular spaces.

As described in greater detail in U.S. Pat. No. 4,502,633, the entire disclosure of which is incorporated herein by reference, the internal nozzle shell 32 and intermediate nozzle shell 34 are both axially adjustable relative to the outer nozzle shell 46 for the purpose flow capacity variation. As intermediate nozzle 34 is axially displaced from the conically tapered internal surface of outer nozzle 46, the outer discharge annulus 48 is enlarged to permit a greater oxygen gas flow. Similarly, as the outer tapered surface of the internal nozzle 32 is axially drawn toward the internally conical surface of the intermediate nozzle 34, the coal slurry discharge area 36 is reduced.

Surrounding the outer nozzle shell 46 is a coolant fluid jacket 60 having an annular end closure 62. A coolant fluid conduit 64 delivers a coolant, such as water, from the upper assembly supply port 54 directly to the inside surface of the end closure plate 62. Flow channeling baffles 66 control the path of coolant flow around the outer nozzle shell to assure a substantially uniform heat extraction and to prevent the coolant from channeling and producing localized hot spots. The end closure 62 includes a nozzle lip 70 that defines an exit orifice or discharge opening for the feeding of reaction materials into the injection burner assembly 20.

Referring particularly to FIG. 3, the planar end of the cooling jacket 62 includes an annular surface 72 which is disposed facing the combustion chamber 16. Typically, the annular surface 72 of cooling jacket is composed of cobalt base metal alloy materials. A problem with this material is that when using high sulfur coal, which is reacted within the closed combustion chamber to produce sulfur containing compounds. Within the reaction chamber 16, these sulfur compounds tend to react with the cobalt base metal alloy materials causing corrosion. A self-consumptive corrosion is sustained that ultimately terminates with failure of the burner assembly 20. Although cobalt is the preferred material of construction for the nozzle assembly 30, other high temperature melting point alloys, such as molybdenum or tantalum may also be used.

A retaining means 74 is provided for affixing the heat shield 76 to the burner nozzle injector assembly 30 and preferably to the annular surface 72. The retaining means 74 can include a plurality of methods and devices that advantageously hold the heat shield 76, preferably in intimate contact with the coolant jacket annular surface 72. For example the retaining means can include a threaded projection that is integral to the annular surface 72, or it can be a separate member secured to the annular surface 72. The projection 74 can be affixed to the annular surface 72 using methods known to those skilled in the art, such as being welded, screwed on, brazed, and the like. The threaded projection 74 extending from the annular surface 72 can be a continuous member, such as a ring, or a plurality of spaced-apart, individual members preferably, which are cylindrical or crescent shaped. Such retaining means is described in greater detail in the commonly owned patent application filed on even date herewith.

Alternatively, the retaining means can include a plurality of external lug elements which are adapted to receive cooperatively aligned channels in the heat shield. Such a design is described in US Pat. No. 5,947,716.

Another adaptation of the retaining means is a bayonet channel that is bored radially from the outer perimeter of the heat shield through a socket pair. A corresponding number of mounting studs are secured to the water jacket end face. Each stud includes an aperture that aligns axially with the respective bayonet channels. To affix the heat shield to the water jacket, bayonet wires are inserted through the radial channels to deadbolt the heat shield to the water jacket at multiple attachment points. Such a design is described in U.S. Pat. No. 5,954,491.

It is understood that the references cited herein are incorporated in their entirety into the disclosure of the present invention and made a part hereof.

The heat shield 76 is formed from a high temperature melting point material such as silicon nitride, silicon carbide, zirconia, molybdenum, tungsten or tantalum. Representative proprietary materials include the Zirconia TZP and Zirconia ZDY products of the Coors Corp of Golden CO. Characteristically, these high temperature materials should tolerate temperatures up to about 1400° C., include a high coefficient of expansion, and remain substantially inert within a high temperature, highly reducing/sulfidizing environment. Preferably, the heat shield includes molybdenum.

In accordance with the present invention, the heat shield 76 includes a high temperature, corrosion resistant coating 78. The coating 78 is applied to the surface of the heat shield 76 facing the combustion chamber to a thickness of from about 0.002 to about 0.020 of an inch (0.05 mm to about 0.508 mm) and preferably from about 0.005 to about 0.015 of an inch (0.127 to about 0.381 mm). To assist in the application of the coating 78 to the heat shield 76, a portion of the heat shield proximate the nozzle lip 70 can have a small radius of from about 0.001 inch to about 0.50 inch (0.0254 mm to about 12.7 mm).

The coating 78 is an alloy having the general formula of MCrAlY wherein M is selected from iron, nickel or cobalt. Desirably, the coating composition includes from about 5–40 weight % Cr, 0.8–35 weight % Al, up to about 1 weight % of the rare earth element yttrium, and 15–25 weight % Co with the balance containing Ni, Si, Ta, Hf, Pt, Rh and mixtures thereof as an alloying ingredient. A preferred alloy includes from about 20–40 weight % Co, 5–35 weight % Cr, 5–10 weight % Ta, 0.8–10 weight % Al, 0.5–0.8 weight % Y, 1–5 weight % Si and 5–15 weight % $Al_2O_3$. Such coating is available from Praxair.

The coating can be applied to the surface of the heat shield using various methods known to those skilled in the powder coating art. For example, the coating can be applied as a fine powder by a plasma spray process. The particular method of applying the coating material is not particularly critical as long as a dense, uniform, continuous adherent coating is achieved. Other coating deposition techniques such as sputtering or electron beam may also be employed.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents.

What is claimed is:

1. A method for protecting a synthesis gas generator burner heat shield composed substantially of molybdenum comprising coating said burner heat shield with an overlay alloy coating composition consisting of from about 20–40 weight % Co, 5–35 weight % Cr, 5–10 weight % Ta, 0.8–10 weight % Al, 0.5–0.8 weight % Y, 1–5 weight % Si and 5–15 weight % $Al_2O_3$.

2. The method of claim 1 wherein said coating has a thickness of from about 0.005 to about 0.015 of an inch (0.127 to about 0.381 millimeters).

3. The method of claim 1 wherein said coating has a thickness of from about 0.002 to about 0.020 of an inch (0.05 mm to about 0.508 mm).

* * * * *